United States Patent
Chapman et al.

(10) Patent No.: US 11,268,414 B2
(45) Date of Patent: Mar. 8, 2022

(54) EXHAUST AFTERTREATMENT COMPONENT WITH BYPASS VALVE

(71) Applicant: Faurecia Emissions Control Technologies, USA, LLC, Columbus, IN (US)

(72) Inventors: Chris Chapman, Columbus, IN (US); Mark Robinson, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 34 days.

(21) Appl. No.: 16/701,385

(22) Filed: Dec. 3, 2019

(65) Prior Publication Data

US 2021/0164374 A1  Jun. 3, 2021

(51) Int. Cl.
| | |
|---|---|
| *F01N 3/031* | (2006.01) |
| *F01N 3/20* | (2006.01) |
| *F01N 3/035* | (2006.01) |
| *F01N 13/00* | (2010.01) |

(52) U.S. Cl.
CPC .............. *F01N 3/031* (2013.01); *F01N 3/035* (2013.01); *F01N 3/208* (2013.01); *F01N 13/0093* (2014.06); *F01N 2410/03* (2013.01); *F01N 2610/146* (2013.01); *F01N 2900/1404* (2013.01)

(58) Field of Classification Search
CPC ........ F01N 3/2066; F01N 3/208; F01N 3/031; F01N 3/035; F01N 2610/00; F01N 2610/146; F01N 13/009; F01N 13/0093; F01N 2410/03; F01N 2900/1404
See application file for complete search history.

(56) References Cited

U.S. PATENT DOCUMENTS

| | | | | |
|---|---|---|---|---|
| 5,349,816 A | * | 9/1994 | Sanbayashi | ........... F01N 3/2053 60/277 |
| 8,756,927 B2 | * | 6/2014 | Doring | ...................... F01N 3/30 60/303 |
| 2004/0139739 A1 | * | 7/2004 | Kagenishi | ........... F01N 13/0097 60/289 |

(Continued)

FOREIGN PATENT DOCUMENTS

| | | |
|---|---|---|
| CN | 105986864 A | 10/2016 |
| CN | 106640293 A | 5/2017 |
| CN | 106894867 A | 6/2017 |

*Primary Examiner* — Hai H Huynh
*Assistant Examiner* — Diem T Tran
(74) *Attorney, Agent, or Firm* — Carlson, Gaskey & Olds, P.C.

(57) ABSTRACT

An exhaust system includes a first aftertreatment substrate configured to receive exhaust gases from an engine and a second aftertreatment substrate downstream of the first aftertreatment substrate, wherein the first aftertreatment substrate is smaller than the second aftertreatment substrate. A bypass valve is configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature.

25 Claims, 2 Drawing Sheets

(56) References Cited

U.S. PATENT DOCUMENTS

| | | | |
|---|---|---|---|
| 2007/0130921 A1* | 6/2007 | Yezerets | F01N 9/002 60/295 |
| 2008/0120966 A1* | 5/2008 | Sugiyama | F01N 3/2053 60/287 |
| 2009/0031711 A1* | 2/2009 | Braun | F01N 3/0231 60/297 |
| 2011/0058999 A1* | 3/2011 | Ettireddy | B01J 23/20 423/213.5 |
| 2014/0010744 A1 | 1/2014 | Ruona et al. | |
| 2014/0223902 A1* | 8/2014 | Yacoub | F01N 13/0093 60/605.1 |
| 2016/0032803 A1* | 2/2016 | Ettireddy | B01J 35/0006 60/289 |

* cited by examiner

EXHAUST AFTERTREATMENT COMPONENT WITH BYPASS VALVE

TECHNICAL FIELD

This disclosure relates generally to an exhaust gas aftertreatment component in a bypass configuration.

BACKGROUND

An exhaust system conducts hot exhaust gases generated by an engine through various exhaust components to reduce emissions and control noise. In one traditional configuration, the exhaust system includes an injection system that injects a NOx reduction fluid such as urea, NH3 carbonate, or any reduction gas or liquid that is a solution of urea and water for example, upstream of a selective catalytic reduction (SCR) catalyst. The injection system includes a doser or injector that sprays the injected fluid into the exhaust stream. The spray is typically concentrated in one area and then spreads out to mix with the exhaust gases. The urea from the injected fluid should be transformed as much as possible into ammonia (NH3) before reaching the SCR catalyst. Low temperature conditions and certain packaging configurations can make this transformation more difficult.

SUMMARY

An exhaust system according to an exemplary aspect of the present disclosure includes, among other things, a first aftertreatment substrate configured to receive exhaust gases from an engine and a second aftertreatment substrate downstream of the first aftertreatment substrate, wherein the first aftertreatment substrate is smaller than the second aftertreatment substrate. A bypass valve is configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature.

In a further non-limiting embodiment of the foregoing system, the first aftertreatment substrate and the second aftertreatment substrate comprise SCR substrates.

In a further non-limiting embodiment of any of the foregoing systems, a DOC or DOC/DPF and a mixer are upstream of the second aftertreatment substrate and downstream of the first aftertreatment substrate.

In a further non-limiting embodiment of any of the foregoing systems, an injection system has at least a first doser configured to inject a reducing agent into the mixer and a second doser configured to inject the reducing agent upstream of the first aftertreatment substrate.

In a further non-limiting embodiment of any of the foregoing systems, the first aftertreatment substrate is positioned immediately downstream of a turbocharger, and the system includes a housing that surrounds the second aftertreatment substrate, a first pipe having a first pipe end in fluid communication with a turbocharger outlet pipe and a second pipe end in fluid communication with an inlet to the housing, and a second pipe having a first pipe end in fluid communication with the turbocharger outlet pipe and a second pipe end in fluid communication with the inlet to the housing, and wherein the bypass valve is positioned within one of the first pipe and the second pipe.

In a further non-limiting embodiment of any of the foregoing systems, the bypass valve is positioned within the first pipe and the first aftertreatment substrate is positioned within the second pipe to provide a parallel configuration.

In a further non-limiting embodiment of any of the foregoing systems, the bypass valve is positioned within the first pipe and the first aftertreatment substrate is positioned within the first pipe downstream of the bypass valve, and wherein when the bypass valve is in a closed position exhaust gas bypasses the first aftertreatment substrate and flows through the second pipe to the inlet to the housing.

In a further non-limiting embodiment of any of the foregoing systems, the bypass valve is positioned within the first pipe and the first aftertreatment substrate is positioned within the second pipe, and wherein when the bypass valve is in a closed position exhaust gas flows through the second pipe into the first aftertreatment substrate.

In a further non-limiting embodiment of any of the foregoing systems, the first aftertreatment substrate is positioned immediately downstream of a turbocharger, and the system includes a housing that surrounds the second aftertreatment substrate, a first plenum that fluidly connects an outlet from the first aftertreatment substrate to the inlet to the housing, a second plenum in fluid communication with a turbocharger outlet pipe, wherein the first aftertreatment substrate is positioned between the first and second plenums, and a pipe portion connecting the second plenum to the first plenum and extending parallel to the first aftertreatment substrate, and wherein the bypass valve is located within the pipe portion.

An exhaust system, according to yet another exemplary aspect of the present disclosure includes, among other things, a first aftertreatment component including at least one first aftertreatment substrate configured to receive exhaust gases from an engine and a second aftertreatment component downstream of the first aftertreatment component. A first housing surrounds at least one upstream substrate, a second housing surrounds at least one second aftertreatment substrate, and a mixer has a mixer housing with an upstream end connected to the first housing and a downstream end connected to the second housing. The first aftertreatment substrate is smaller than the second aftertreatment substrate. A bypass valve is configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature.

In a further non-limiting embodiment of any of the foregoing systems, the at least one first aftertreatment substrate and the at least one second aftertreatment substrate comprise SCR substrates, and wherein the upstream substrate comprises a DOC or DOC/DPF, and the system includes an injection system with at least a first doser configured to inject a reducing agent into the mixer and a second doser configured to inject the reducing agent upstream of the first aftertreatment substrate, and wherein where the bypass valve and the first and second dosers are controlled by at least one electronic control unit.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary exhaust system with a light off aftertreatment component having a bypass configuration.

Figure 1:
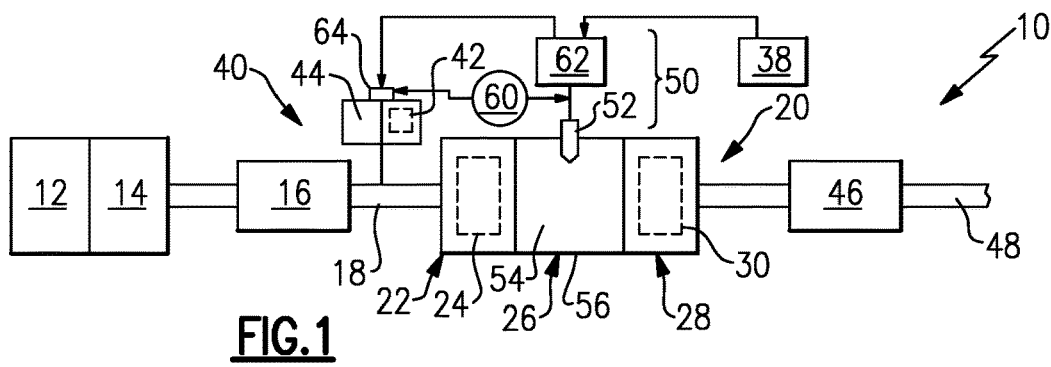
FIG. 1 is a schematic illustration of a vehicle exhaust system.

As shown in FIG. 1, a vehicle exhaust system 10 includes an engine 12 that generates exhaust gases that are conveyed through an exhaust manifold 14 to various downstream exhaust components. In one example configuration, a turbocharger 16 is located downstream of the exhaust manifold 14 and includes a turbocharger outlet pipe 18. In one example, an in-line exhaust aftertreatment assembly 20 is positioned downstream of the turbocharger outlet pipe 18. In one example, the in-line exhaust aftertreatment assembly 20 includes a first exhaust component 22 with a first aftertreatment substrate 24, a mixer 26 downstream of the first exhaust component 22, and a second exhaust component 28 with a second aftertreatment substrate 30 positioned downstream of the mixer 26. In this example arrangement, the first exhaust component 22, mixer 26, and second exhaust 28 component are all coaxial with each other to form the in-line exhaust aftertreatment assembly 20.

Upstream of the in-line exhaust aftertreatment assembly 20 is a bypass arrangement 40 that includes an additional aftertreatment exhaust component. In one example, the bypass arrangement 40 includes an aftertreatment substrate 42 and a valve 44. The bypass arrangement 40 is configured to provide ultra low NOx emission and facilitate the reduction of cold start emissions. The bypass arrangement 40 can comprise various configurations, examples of which are shown in FIGS. 2-5. In one example, the bypass arrangement 40 is immediately downstream of the turbocharger outlet pipe 18 and immediately upstream of the in-line exhaust aftertreatment assembly 20. This brings the aftertreatment substrate 42 closer to the engine heat source to reduce thermal inertia and provide for earlier light off. This will be discussed in greater detail below.

Exhaust gas exits the bypass arrangement 40 and enters the first exhaust component 22 of the in-line exhaust aftertreatment assembly 20. In one example, the first aftertreatment substrate 24 of the first exhaust component 22 comprises a diesel oxidation catalyst (DOC) or a DOC combined with a diesel particulate filter (DPF). Exhaust gas exits the first exhaust component 22 and enters the mixer 26, which is used to direct a mixture of a reducing agent and engine exhaust gases into the second aftertreatment substrate 30 of the second exhaust component 28. The second aftertreatment substrate 30 comprises at least one catalytic reduction (SCR) substrate 24, for example. Downstream of the second aftertreatment substrate 30 there may be various additional downstream exhaust components 46, which can include pipes, mufflers, resonators, etc. The downstream exhaust components 46 direct the exhaust gases to an outlet to atmosphere via a tailpipe 48. The components can be mounted in various different configurations and combinations dependent upon the type of application and available packaging space.

Figure 2:
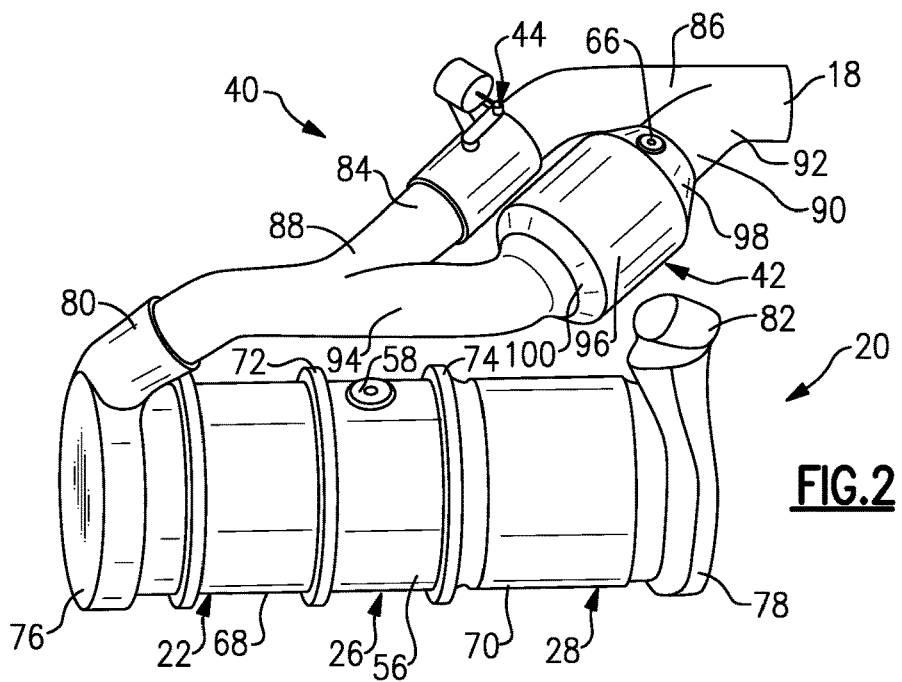
FIG. 2 is a perspective view of a first example of a bypass arrangement for the exhaust system of FIG. 1.

An injection system 50 includes an injector or doser 52 that delivers a reducing agent, e.g., a NOx reduction fluid such as urea, NH3 carbonate, or any reduction gas or liquid that is a solution of urea and water, into an internal cavity 54 of the mixer 26 and upstream of the second aftertreatment substrate 30. The operation of the doser 52 is known, and any type of injector or doser can be used. The mixer 26 mixes engine exhaust gases with the injected reducing agent. In one example, the doser 52 is mounted to an outer peripheral surface of an outer housing 56 of the mixer 26 at a doser mount interface 58 as shown in FIG. 2. The doser 52 receives the reducing agent from a fluid supply 60 and a controller 62, e.g. an electronic control unit, controls injection of the fluid as known.

In one example, the bypass arrangement 40 includes a second injector or doser 64 as shown in FIG. 1. The doser 64 injects reducing agent into an exhaust gas stream exiting the turbocharger 16 at a location that is upstream from the aftertreatment substrate 42. The doser 64 is mounted within the bypass arrangement 40 at a doser mount interface 66 (FIGS. 2-5). The doser 64 receives the reducing agent from the fluid supply 60 and the controller 62 controls injection of the reducing agent. Optionally, the doser 64 has a separate fluid supply and/or a separate controller.

The controller 62 can include a processor, memory, and one or more input and/or output interfaces that are communicatively coupled via a local interface including one or more buses and/or other wired or wireless connections, for example. The controller 62 operates as known and may be a hardware device for executing software and can comprise a processor, a central processing unit (CPU), or generally any device for executing software instructions. The controller 62 can be a main vehicle controller or a dedicated controller for the exhaust system. One or more vehicle sensors 38 provide vehicle data to the controller 62. In one example, the sensors 38 include a temperature sensor to sense a temperature of the ambient environment.

The bypass arrangement 40 provides for the upstream aftertreatment substrate, e.g. the upstream SCR, to be smaller in size than the downstream aftertreatment substrate 30, e.g. the downstream SCR. The bypass valve 44 is configured to direct exhaust gas through the upstream SCR prior to entering the downstream SCR when an exhaust gas temperature is, for example, below a predetermined temperature, and is configured to allow exhaust gas to bypass the upstream SCR and enter the downstream SCR when the exhaust gas temperature is above the predetermined temperature. This allows for a smaller diameter (smaller size) light off SCR to be brought closer the engine heat source to reduce thermal inertial and enable earlier light off. The smaller size SCR provides for a faster light off during a cold start condition, but is flow restrictive at higher exhaust gas flow rates when the system is at a desired operating temperature and the light off SCR is no longer needed. This enables a close-coupled aftertreatment and conventional aftertreatment system to work independently throughout the full operating range of the engine 12 without back pressure penalty.

Examples of the bypass arrangement 40 are shown in FIGS. 2-5. In each of the examples, the first aftertreatment substrate 42 is closer to the engine 12 than the in-line exhaust aftertreatment assembly 20. In one example, the first aftertreatment substrate 42 is positioned immediately downstream of the turbocharger 16 to provide a close-coupled configuration such that no additional aftertreatment components are between the turbocharger 16 and the bypass arrangement 40. In each example, the first exhaust component 22 includes a first outer housing 68, the second exhaust component 28 includes a second outer housing 70, and the mixer housing 56 connects the first and second outer housings 68, 70 together. For example, an upstream end 72 of the mixer housing 56 is connected to the first outer housing 68 and a downstream end 74 of the mixer housing 56 is connected to the second outer housing 70. In the example shown in FIG. 2, a first end cap 76 is connected an upstream end of the first outer housing 68 and a second end cap 78 is connected to a downstream end of the second outer housing 70. The first end cap 76 includes an inlet 80 that connects to an outlet of the bypass arrangement 40 and the second end cap 78 includes an outlet 82 that connects to the downstream exhaust components 46 (FIG. 1).

In the example of FIG. 2, the bypass arrangement 40 includes a first pipe 84 having a first pipe end 86 in fluid communication with the turbocharger outlet pipe 18 and a second pipe end 88 in fluid communication with the inlet 80. A second pipe 90 has a first pipe end 92 in fluid communication with the turbocharger outlet pipe 18 and a second pipe end 94 in fluid communication with the inlet 80. In this example, the bypass valve 44 is positioned within the first pipe 84 and the first aftertreatment substrate 42 is positioned within the second pipe 90 to provide a parallel configuration. In one example, the bypass valve 44 comprises a butterfly valve having a flap that moves between a closed position where a substantial portion or all of a cross-section of the associated pipe is blocked by the flap, and an open position where a maximum amount of exhaust gas flow is provided. In one example, the bypass valve 44 is only moveable between an open position and a closed position. Optionally, the controller 62 can move the valve 44 between a plurality of positions. In the example of FIG. 2, when the valve 44 is closed, the exhaust gas is forced to flow into the second pipe 90 to pass through the first aftertreatment substrate 42 prior to entering the downstream assembly 20. When the desired temperature is reached, the valve 44 opens and exhaust gas can flow through the first pipe 84 to enter the downstream assembly 20. The first aftertreatment substrate 42 serves as a restriction such that a significant majority of the exhaust gas flows through the first pipe 84 rather than the second pipe 90 when the valve 44 is open.

In one example, the first aftertreatment substrate 42 includes a center housing 96, an inlet cone 98 connected to an upstream end of the center housing 96, and an outlet cone 100 connected to the downstream end of the center housing 96. In one example, the inlet cone 98 includes the doser mount interface 66 that is configured to receive the doser 64.

Figure 3:
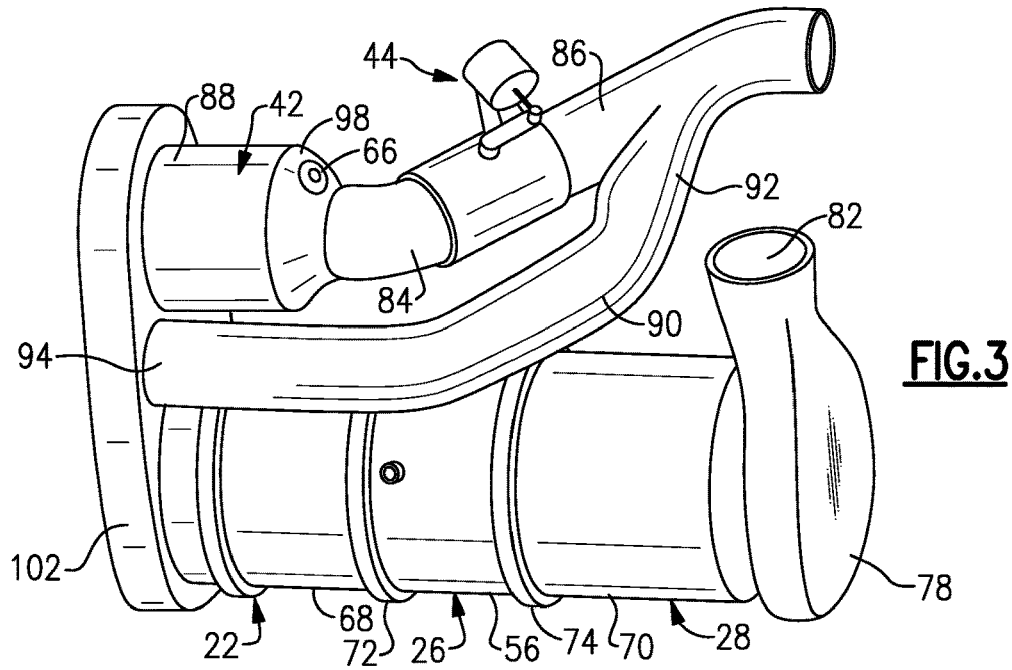
FIG. 3 is a perspective view of another example of a bypass arrangement for the exhaust system of FIG. 1.

In the example of FIG. 3, the bypass valve 44 is positioned within the first pipe 84 and the first aftertreatment substrate 42 is positioned within the first pipe 84 downstream of the bypass valve 44. When the bypass valve 44 is in a closed position, all of the exhaust gas bypasses the first aftertreatment substrate 42 and flows through the second pipe 90 to the inlet 80. When the bypass valve 44 is in the open position, a portion of the exhaust gas flows through the first aftertreatment substrate 42 prior to entering the downstream assembly 20. In this configuration, the first end cap 76 is replaced by an inlet plenum 102 that fluidly connects an outlet from the first aftertreatment substrate 42 to the inlet to the first outer housing 68. The second pipe end 94 of the second pipe 90 is directly connected to the inlet plenum 102 downstream of the first aftertreatment substrate 42. This configuration thus provides a U-shaped plenum 102 with the first aftertreatment substrate 42 mounted in parallel with the downstream exhaust aftertreatment assembly 20, and the bypass valve 44 is upstream of the first aftertreatment substrate 42, which forces the exhaust gas through the bypass pipe 90 to the downstream exhaust aftertreatment assembly 20.

Figure 4:
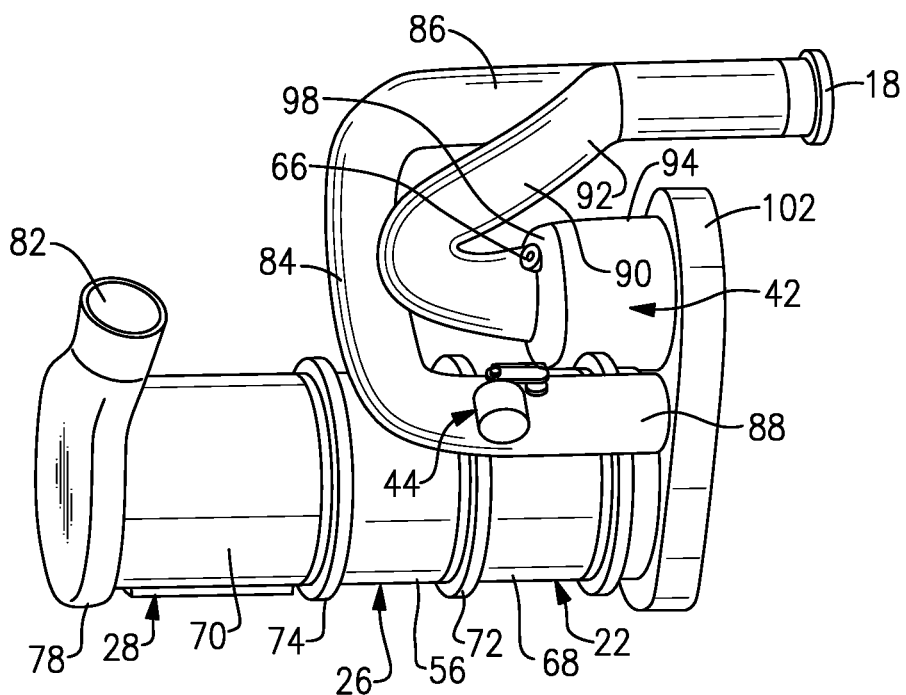
FIG. 4 is a perspective view of another example of a bypass arrangement for the exhaust system of FIG. 1.

FIG. 4 shows an example configuration where the bypass valve 44 is positioned within the first pipe 84 and the first aftertreatment substrate 42 is positioned within the second pipe 90. When the bypass valve 44 is in a closed position, exhaust gas flows through the second pipe 90 into the first aftertreatment substrate 42 prior to entering the downstream exhaust aftertreatment assembly 20. When the bypass valve 44 is in the open position, the majority of the exhaust gas flows through the second pipe 90 to the downstream exhaust aftertreatment assembly 20. In this configuration, the first end cap 76 is also replaced by the inlet plenum 102 that fluidly connects the outlet from the first aftertreatment substrate 42 to the inlet to the first housing 68. The second pipe end 88 of the first pipe 84 is directly connected to the inlet plenum 102 downstream of the first aftertreatment substrate 42. As such, this configuration is similar to that of FIG. 3 but is in a reversed position with the bypass valve 44 in parallel with the first aftertreatment substrate 42.

Figure 5:
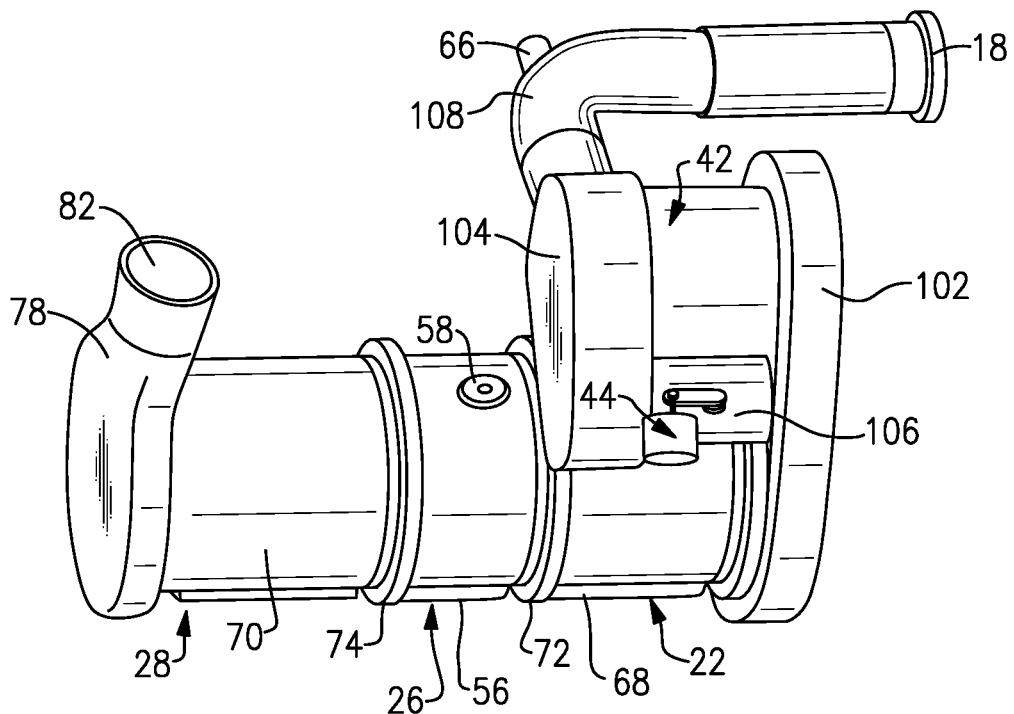
FIG. 5 is a perspective view of another example of a bypass arrangement for the exhaust system of FIG. 1.

FIG. 5 shows an example with two plenums. In this example, the first plenum 102 fluidly connects the outlet from the first aftertreatment substrate 42 to the inlet to the first outer housing 68. A second plenum 104 is in fluid communication with the turbocharger outlet pipe 18, and the first aftertreatment substrate 42 is positioned between the first 102 and second 104 plenums. A first pipe portion 106 connects the second plenum 104 to the first plenum 102 and extends parallel to the first aftertreatment substrate 42. The bypass valve 44 is located within the first pipe portion 106. A second pipe portion 108 connects the turbocharger outlet pipe 18 to an inlet to the second plenum 104. The additional pipe portion 108 includes the doser mount interface 66 that is configured to receive the doser 64. As such, this configuration is similar to that of FIG. 4 but includes an inlet plenum 104 that replaces the first 84 and second 90 pipes to reduce overall complexity, as well as reducing the overall effective length from the engine heat source and thermal inertia to allow the first aftertreatment substrate 42 to heat up more quickly.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust system comprising:
   a bypass;
   a first aftertreatment substrate configured to receive exhaust gases from an engine, the first aftertreatment substrate arranged within the bypass;
   a second aftertreatment substrate arranged within a housing and being positioned downstream of the first aftertreatment substrate, wherein the bypass feeds into the housing; and
   a bypass valve arranged within the bypass and configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature; and
   wherein the bypass comprises at least a first pipe portion and a second pipe portion that is non-coaxial with the first pipe portion, and wherein the first and second pipe portions are non-coaxial with the housing, and wherein the first aftertreatment substrate is positioned within one of the first pipe portion and the second pipe portion, and wherein the bypass valve is positioned within one of the first pipe portion and the second pipe portion.

2. The exhaust system according to claim 1, wherein the first aftertreatment substrate and the second aftertreatment substrate comprise SCR substrates, and wherein the first aftertreatment substrate is smaller than the second aftertreatment substrate.

3. The exhaust system according to claim 1, wherein the first aftertreatment substrate is positioned within one of the first pipe portion and the second pipe portion and the bypass valve is positioned within the other of the first pipe portion and the second pipe portion.

4. The exhaust system according to claim 1, wherein the first aftertreatment substrate and the bypass valve are both positioned within the first pipe portion or within the second pipe portion.

5. An exhaust system comprising:
   a bypass;
   a first aftertreatment substrate configured to receive exhaust gases from an engine, the first aftertreatment substrate arranged within the bypass;
   a second aftertreatment substrate arranged within a housing and being positioned downstream of the first aftertreatment substrate, wherein the bypass feeds into the housing;
   a DOC or DOC/DPF upstream of the second aftertreatment substrate and downstream of the first aftertreatment substrate;
   a mixer upstream of the second aftertreatment substrate and downstream of the first aftertreatment substrate; and
   a bypass valve arranged within the bypass and configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature, and wherein the mixer and the housing are coaxial, and wherein the bypass includes at least first and second pipe portions that are non-coaxial with the mixer and the housing.

6. The exhaust system according to claim 5, including an injection system with at least a first doser configured to inject a reducing agent into the mixer and a second doser configured to inject the reducing agent upstream of the first aftertreatment substrate.

7. The exhaust system according to claim 6, wherein where the bypass valve and the first and second dosers are controlled by at least one electronic control unit.

8. An exhaust system comprising:
   a first aftertreatment substrate configured to receive exhaust gases from an engine, wherein the first aftertreatment substrate is positioned immediately downstream of a turbocharger;
   a second aftertreatment substrate downstream of the first aftertreatment substrate;
   a first housing that surrounds the second aftertreatment substrate;
   a DOC or DOC/DPF upstream of the second aftertreatment substrate and downstream of the first aftertreatment substrate;
   a second housing that surrounds the DOC or DOC/DPF;
   a mixer comprising a mixer housing that is upstream of the second aftertreatment substrate and downstream of the first aftertreatment substrate, and wherein the mixer housing directly couples an outlet from the second housing to an inlet to the first housing;
   a bypass valve configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature;
   a first pipe having a first pipe end in fluid communication with a turbocharger outlet pipe and a second pipe end in fluid communication with an inlet to the first housing; and
   a second pipe having a first pipe end in fluid communication with the turbocharger outlet pipe and a second pipe end in fluid communication with the inlet to the first housing, and wherein the bypass valve is positioned within one of the first pipe and the second pipe, and wherein the mixer housing and the first and second housings are all coaxial, and wherein the first pipe and second pipe are non-coaxial with each other, and wherein the first pipe and second pipe are non-coaxial with the mixer housing and the first and second housings.

9. The exhaust system according to claim 8, wherein the bypass valve is positioned within the first pipe and the first aftertreatment substrate is positioned within the second pipe to provide a parallel configuration.

10. The exhaust system according to claim 8, wherein the bypass valve is positioned within the first pipe and the first aftertreatment substrate is positioned within the first pipe downstream of the bypass valve, and wherein when the bypass valve is in a closed position exhaust gas bypasses the first aftertreatment substrate and flows through the second pipe to the inlet to the first housing.

11. The exhaust system according to claim 10, including an inlet plenum that fluidly connects an outlet from the first aftertreatment substrate to the inlet to the first housing, and wherein the second pipe end of the second pipe is directly connected to the inlet plenum downstream of the first aftertreatment substrate.

12. The exhaust system according to claim 8, wherein the bypass valve is positioned within the first pipe and the first aftertreatment substrate is positioned within the second pipe, and wherein when the bypass valve is in a closed position exhaust gas flows through the second pipe into the first aftertreatment substrate.

13. The exhaust system according to claim 12, including an inlet plenum that fluidly connects an outlet from the first aftertreatment substrate to the inlet to the first housing, and wherein the second pipe end of the first pipe is directly connected to the inlet plenum downstream of the first aftertreatment substrate.

14. The exhaust system according to claim 8, wherein the first aftertreatment substrate includes a center housing surrounding the first aftertreatment substrate, an inlet cone connected to an upstream end of the center housing, and an outlet cone connected to the downstream end of the center housing, and wherein the inlet cone includes a doser mount interface configured to receive a doser.

15. The exhaust system according to claim 1, wherein the first aftertreatment substrate is positioned immediately downstream of a turbocharger, and the bypass including
   a first plenum that fluidly connects an outlet from the first aftertreatment substrate to an inlet to the housing,
   a second plenum in fluid communication with a turbocharger outlet pipe, wherein the first aftertreatment substrate is positioned between the first and second plenums, and
   a pipe portion connecting the second plenum to the first plenum and extending parallel to the first aftertreatment substrate, and wherein the bypass valve is located within the pipe portion which comprises the one of the first pipe portion and the second pipe portion.

16. The exhaust system according to claim 15, include an additional pipe portion connecting the turbocharger outlet pipe to an inlet to the second plenum, and wherein the additional pipe portion includes a doser mount interface configured to receive a doser.

17. An exhaust system comprising:
   a bypass including a first aftertreatment component including at least one first aftertreatment substrate configured to receive exhaust gases from an engine;
   a second aftertreatment component downstream of the first aftertreatment component and including a first housing surrounding at least one upstream substrate, a second housing surrounding at least one second aftertreatment substrate, and a mixer having a mixer housing with an upstream end connected to the first housing and a downstream end connected to the second housing, and wherein the first aftertreatment substrate is smaller than the second aftertreatment substrate, and wherein the bypass feeds into an inlet to the first housing; and
   a bypass valve arranged within the bypass and configured to direct exhaust gas through the first aftertreatment substrate prior to entering the second aftertreatment substrate when an exhaust gas temperature is below a predetermined temperature and is configured to allow exhaust gas to bypass the first aftertreatment substrate and enter the second aftertreatment substrate when the exhaust gas temperature is above the predetermined temperature.

18. The exhaust system according to claim 17, wherein the at least one first aftertreatment substrate and the at least one second aftertreatment substrate comprise SCR substrates, and wherein the upstream substrate comprises a DOC or DOC/DPF, and wherein the upstream substrate, the mixer, and the at least one second aftertreatment substrate are coaxial, and wherein the at least one first aftertreatment substrate is non-coaxial with the at least one second aftertreatment substrate, and including an injection system with at least a first doser configured to inject a reducing agent into the mixer and a second doser configured to inject the reducing agent upstream of the first aftertreatment substrate, and wherein where the bypass valve and the first and second dosers are controlled by at least one electronic control unit.

19. The exhaust system according to claim 17, wherein the first aftertreatment substrate is positioned immediately downstream of a turbocharger, and the bypass including
   a first pipe having a first pipe end in fluid communication with a turbocharger outlet pipe and a second pipe end in fluid communication with the inlet to the first housing,
   a second pipe having a first pipe end in fluid communication with the turbocharger outlet pipe and a second pipe end in fluid communication with the inlet to first housing, and wherein the bypass valve is positioned within one of the first pipe and the second pipe, and
   wherein the first pipe and the second pipe are non-coaxial, and wherein the first and second pipes are non-coaxial with the first housing.

20. The exhaust system according to claim 19, wherein
   the bypass valve is positioned within the first pipe and the first aftertreatment substrate is positioned within the second pipe to provide a parallel configuration,
   the bypass valve is positioned within the first pipe and the first aftertreatment substrate is positioned within the first pipe downstream of the bypass valve, and wherein when the bypass valve is in a closed position exhaust gas bypasses the first aftertreatment substrate and flows through the second pipe to the inlet to the first housing, or
   the bypass valve is positioned within the first pipe and the first aftertreatment substrate is positioned within the second pipe, and wherein when the bypass valve is in a closed position exhaust gas flows through the second pipe into the first aftertreatment substrate.

21. The exhaust system according to claim 20, including an inlet plenum that fluidly connects an outlet from the first aftertreatment substrate to an inlet to the first housing.

22. The exhaust system according to claim 17, wherein the first aftertreatment substrate is positioned immediately downstream of a turbocharger, and the bypass including
   a first plenum that fluidly connects an outlet from the first aftertreatment substrate to an inlet to the first housing,
   a second plenum in fluid communication with a turbocharger outlet pipe, wherein the first aftertreatment substrate is positioned between the first and second plenums,
   a pipe portion connecting the second plenum to the first plenum and extending parallel to the first aftertreatment substrate, and wherein the bypass valve is located within the pipe portion, and
   wherein the pipe portion is non-coaxial with the first housing.

23. The exhaust system according to claim 17, wherein the bypass comprises at least a first pipe portion and a second pipe portion that is non-coaxial with the first pipe portion, and wherein the first and second pipe portions are non-coaxial with the first housing, and wherein the first aftertreatment substrate is positioned within one of the first pipe portion and the second pipe portion, and wherein the bypass valve is positioned within one of the first pipe portion and the second pipe portion.

24. The exhaust system according to claim 23, wherein the first pipe portion defines a first flow path and the second pipe portion defines a second flow path that bypasses the first flow path, and wherein the first and second flow paths both feed into a main flow path extending through the first housing.

25. The exhaust system according to claim 8, wherein the first pipe defines a first flow path and the second pipe defines a second flow path that bypasses the first flow path, and wherein the first and second flow paths both feed into a main flow path extending through the first housing.

* * * * *